Oct. 25, 1927.  1,647,075
R. BOWEN
PROCESS OF FABRICATING AGGLOMERATED MASSES
Filed Jan. 5, 1924    6 Sheets-Sheet 1

Oct. 25, 1927.

R. BOWEN 1,647,075

PROCESS OF FABRICATING AGGLOMERATED MASSES

Filed Jan. 5, 1924  6 Sheets-Sheet 2

INVENTOR
Richard Bowen
BY
Duell, Warfield & Duell
ATTORNEY

Oct. 25, 1927.
R. BOWEN
1,647,075
PROCESS OF FABRICATING AGGLOMERATED MASSES
Filed Jan. 5, 1924
6 Sheets-Sheet 3

INVENTOR
Richard Bowen
BY
ATTORNEY

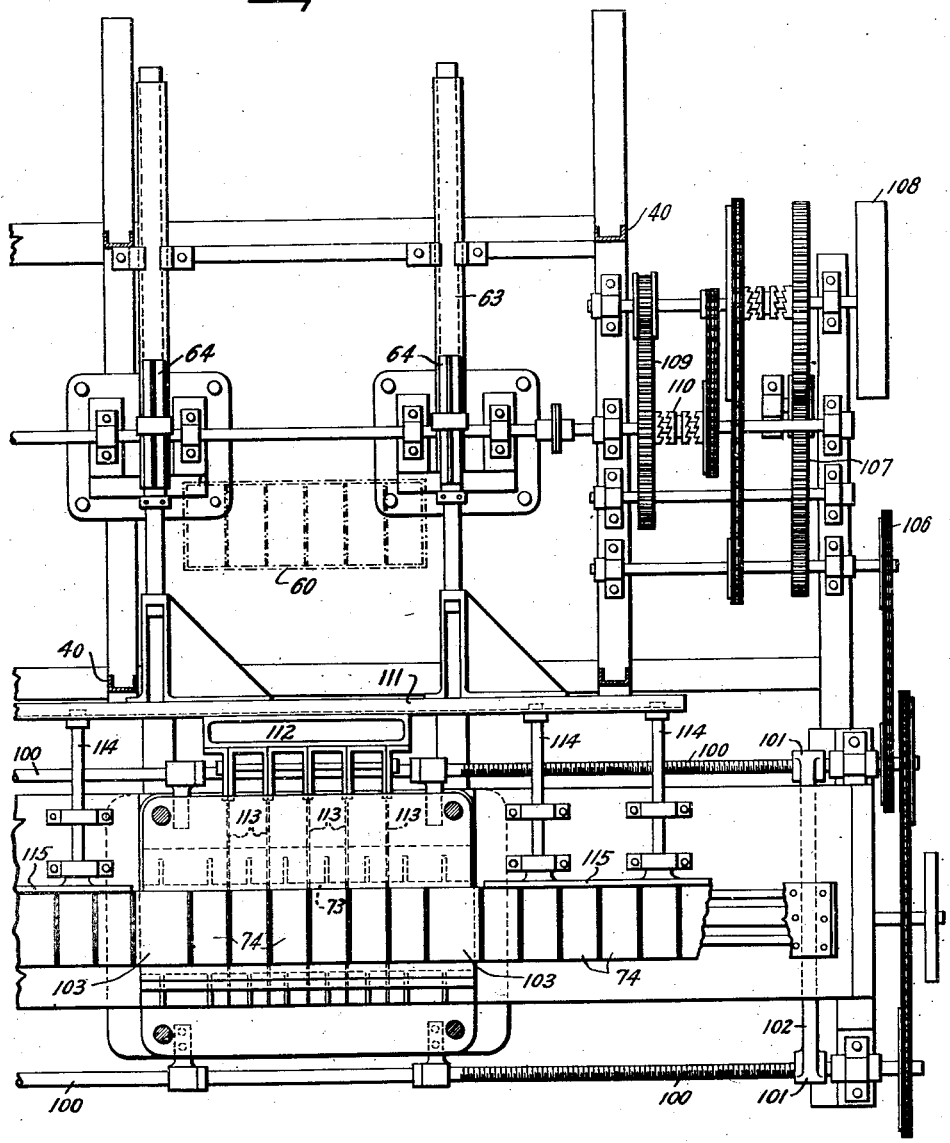

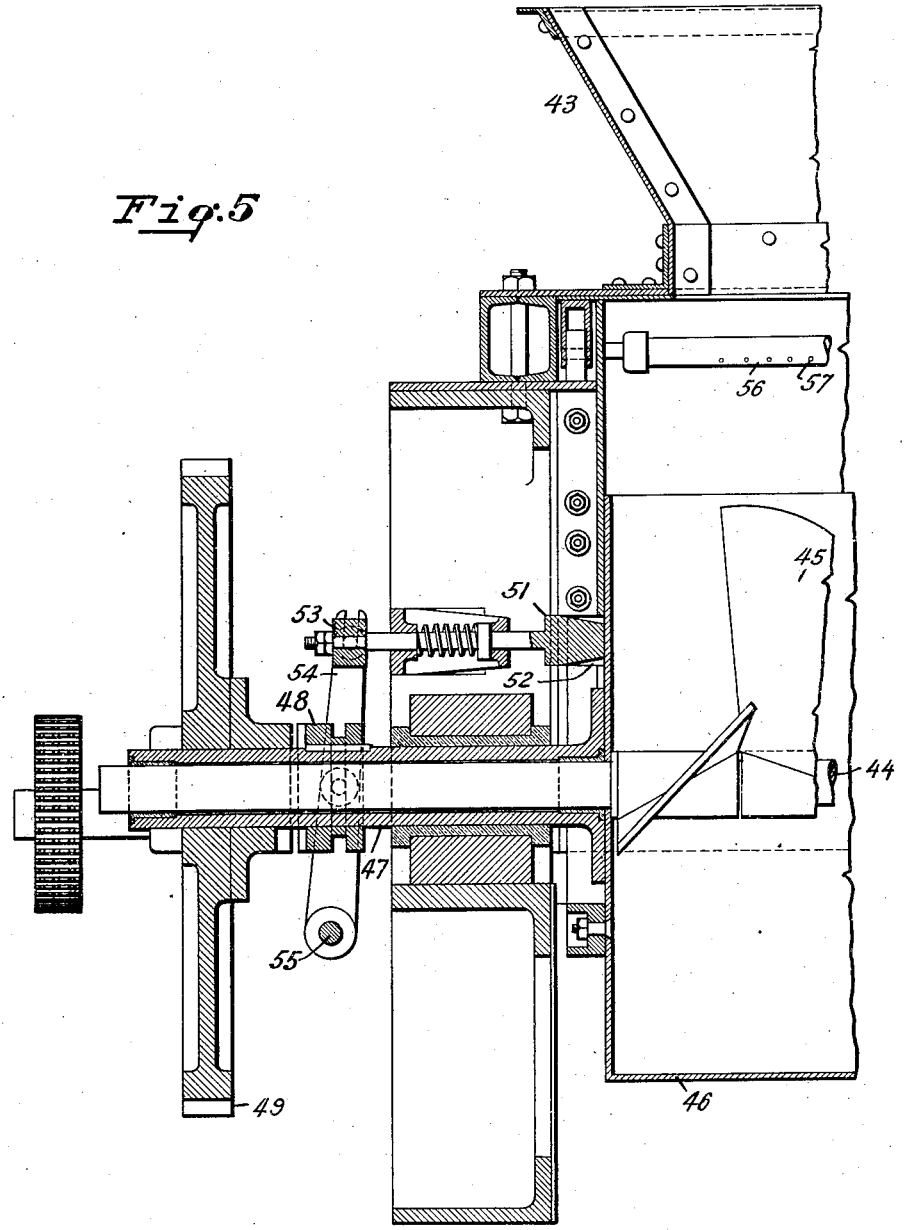

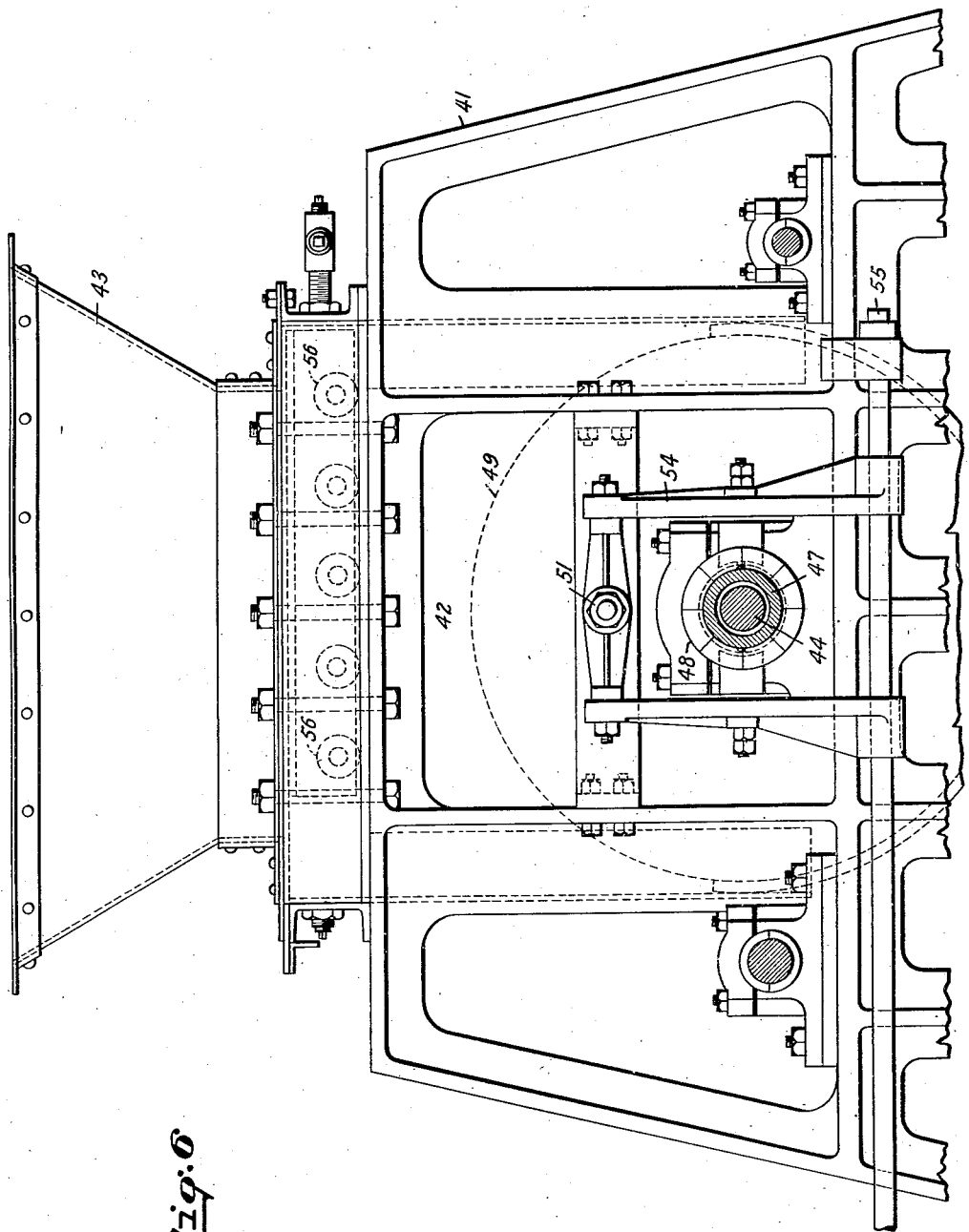

Patented Oct. 25, 1927.

1,647,075

UNITED STATES PATENT OFFICE.

RICHARD BOWEN, OF COLUMBUS, OHIO, ASSIGNOR TO SUPER COAL PROCESS COMPANY, OF AUGUSTA, MAINE, A CORPORATION OF MAINE.

PROCESS OF FABRICATING AGGLOMERATED MASSES.

Application filed January 5, 1924. Serial No. 684,681.

This invention relates to a process of fabricating agglomerated masses, and in one of its more specific aspects to a process of fabricating fuel masses.

The object generally of this invention is to provide an improved and efficient procedure for producing agglomerated masses. Specifically an object of this invention is to provide an improved procedure for fabricating fuel masses of carboniferous material and binder so as to have a substantially uniform texture.

Other objects of the invention will be in part obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

For a fuller understanding of the nature and objects of the invention reference should be had to the following detailed description taken in connection with the accompanying drawing, in which:

Fig. 4 is a plan view of the same apparatus.

Figs. 5 and 6 are respectively fragmentary sectional and elevational views, showing details of the mixer employed in the apparatus of Fig. 2.

In the practice of the process of this invention, a sequence of steps, or operations, is followed which results in producing an agglomerated mass of heterogeneous components not readily miscible, for example granular material and a viscous binder, which has an amorphous structure, compacted and interfitted together so as to have a substantially uniform texture throughout. Such mass is very dense; and, if the granules be relatively small, will be substantially devoid of interstices and interior pockets to envelope gases, moisture, and the like, together with loosely knit-together interior particles.

This result is attained, not by the steady application of a relatively high pressure, as heretofore generally practiced, but by means of high frequency vibrations applied in a manner so as to effect a pure relative particle acceleration in the mass, such vibration being applied after the mass has been brought to the proper condition of fluidity.

The granular material may be of substantially any nature not soluble with respect to the binder and size although it is preferably confined to the odinary commercial sizes, such material may be for example granular or crushed stone, comminuted or shredded fiber, carboniferous granules, culm, duff, and the like; while the binder, in order to yield an amorphous structure, should be of a character which does not develop a crystalline structure, and does not react chemically with the granular material, and may be for example, resin, shellac, waxes, molasses, starch, a pitch and the like. Such binders generally have a relatively high degree of viscosity.

The degree of compacting attained by the practice of this invention is of a relatively high order, and permits of materially less binder being used than heretofore; the amount of binder used not being substantially in excess of 10% by weight of the total mass agglomerated though preferably less. The amount used envelopes the granules with a relatively thin film, and is scarcely appreciable to the naked eye when sections of the mass are examined.

Figure 1:
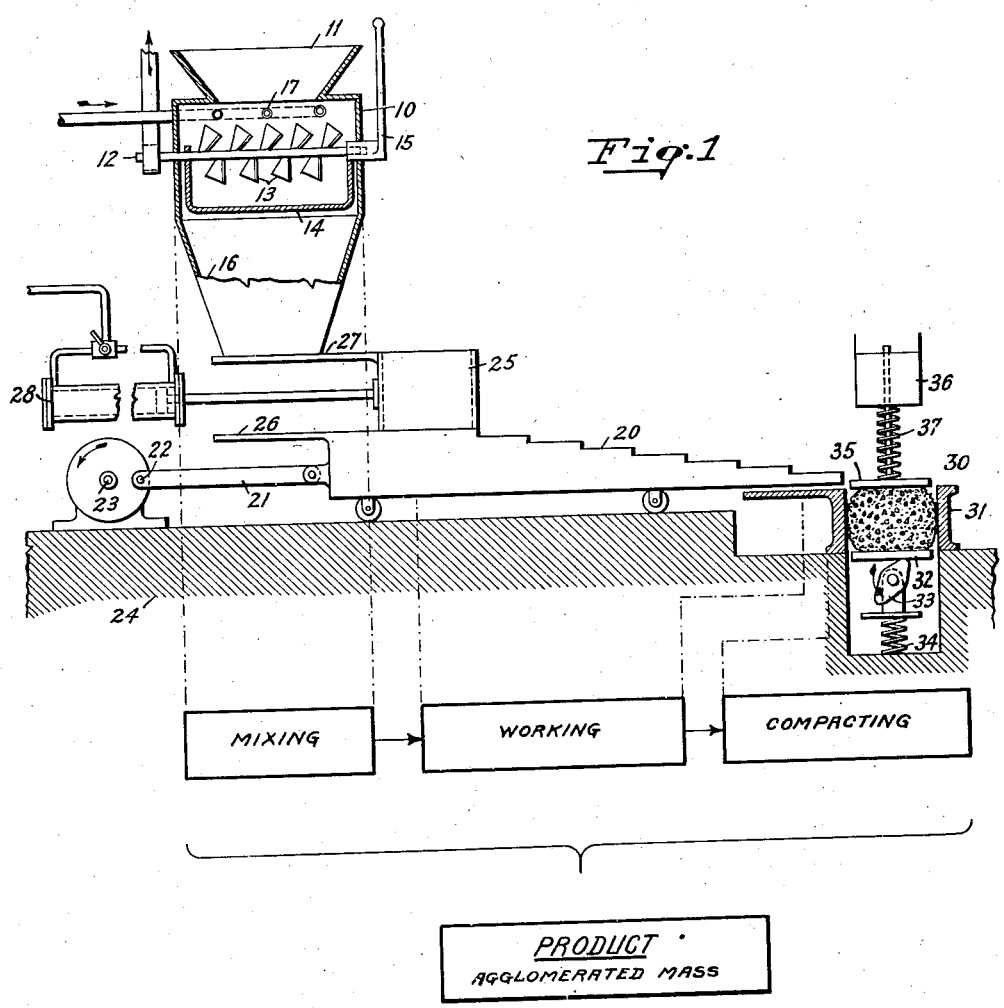
Figure 1 shows schematically the functional relation of specific means for carrying out the several steps in the process of this invention.

In Fig. 1, the sequence of steps or operations to be practiced in this invention is schematically illustrated; the first step is that of mixing, which is accomplished in the mixer shown generally at 10. The second step is that of working which follows that of mixing in order that the mixed components may be finally brought to the desired state of fluidity before being compacted; this working is accomplished on a suitable working surface shown at 20. The third or last step is that of compacting, and follows substantially immediately after the mass has been worked; this third step involves the application of high frequency vibrations to the mass, and is preferably accomplished by means of a vibrating machine, such as shown at 30; this machine has a movable support for the mass while being subjected to the influence of the vibrations. When sufficiently compacted, the mass is taken from the vibrating machine to a place of storage, or use, the binder becoming rigid by "curing," for example by the drying, or cooling of the mass, as the case may be.

The mixing according to this invention should insure that the heterogeneous components are thoroughly and intimately dispersed throughout the mixture. The agitation required in this step is preferably carried on in a closed chamber where the materials are moved relatively not only horizontally but vertically, so that the mixing takes place while the mass is substantially in a physically suspended condition, thereby insuring the production of a light and easily penetrable mixture. Where the fluidity of the binder is dependent on temperature, it is generally preferable to heat the ingredients in the mixer to a temperature considerably in excess of the melting point of the binder, as it materially improves the dispersion of the binder, the binder thereby acting as a lubricant for the granules. Such dispersion permits using a smaller quantity than would otherwise be needed.

In the practice of this process the step of mixing is preferably followed with a step of working, since unless special precautions are taken, the mixing together of heterogeneous components will not, as a rule, result in a uniform mixture having the best consistency or fluidity to be compacted by the application of high frequency vibrations. This step of working is with advantage carried out on a working surface accompanied with the sudden application of force; for example, pounding the mixture. Such working, however, is best accomplished while the mass is in a subdivided state, to which a regular series of impacts is imparted to respective portions so as to prevent the formation of any balls or dense nodules prior to the ultimate compacting. Working the mass in this manner for a sufficient time substantially insures a relatively fluid mixture of light and granular consistency, while subdividing the mass materially assists in the removal of air and other gases.

Obviously the steps of mixing and working described above, may be regarded together as one, which effects the conditioning of the mixed mass in a manner that intermingles the components and brings the mixture into a desired state of fluidity.

The mass when thus conditioned, is ready to be compacted by the application of vibrations. In this step of compacting the vibrations are applied directly to the mass substantially immediately after it has been worked, or conditioned. To this end, the mass is preferably supported on a suitable platform, or pallet which may be, for example, the movable bottom of a receptacle adapted to hold the mass during this operation. While supporting a mass to be compacted, vibrations, which are of relatively high frequency, are mechanically transmitted directly to the support in such a manner as to impart a simple impact unimpeded by other motions. Any suitable instrumentality adapted to produce high frequency harmonic motion if suitably applied, may be employed to impart the movement desired, for example a rapidly revolving cam. Other instrumentalities of this character, for example, an electric, pneumatic, or other engine adapted to produce sufficiently rapid reciprocations, can be used with equal facility.

In order, however, that the harmonic motion imparted to the pallet or support shall not be disturbed or impeded by disharmonic or other transient movements of the vibrating instrumentality it should not be rigidly mounted, but arranged so as yieldingly to apply the vibratory motion. Such arrangement permits the disturbing motion or transient to be absorbed by the vibrating instrumentality and its mounting without being imparted to the mass. Such arrangement also permits any excess in the force of the impacts imparted to be absorbed.

In the mounting of the pallet or support for the mass, provision must, of course, be made for the necessary degrees of freedom of motion. For simple reciprocating motion, but one degree of freedom of motion is necessary, for example, motion in a vertical direction. By making suitable provision for additional degrees of motion other types of harmonic motion can be also employed to achieve the desired relative particle acceleration in the mass, such for example as circular, elliptical and trochoidal motions. Where the mass has been worked in a subdivided state, it is preferable to place a number of the portions thus cut off, in superposed layers upon the support and subject them together to the influence of the high frequency vibrations.

The density and fluidity of the mass are factors which govern in large measure the particle displacement in the mass, which ensues as a result of the acceleration imparted. The ensuing displacement is, however, dependent also upon another factor, namely, the degree of compression in the mass; as a rule, the greater the compression within limits the more effective will be the vibration that is applied. To this end therefore a certain amount of external pressure is preferably applied during compacting. This pressure should be applied constantly, but not rigidly. A plate to which force is applied yieldingly arranged to bear on the body of the mass and to follow it as contraction takes place under the influence of the applied vibrations serves admirably to effect the desired compression. A weight acting through a spring serves to apply in a yielding manner the force to the plate. Any suitable device other than a weight which will apply sufficient force yieldingly to the pressure surface to attain the desired compression may also be used, such, for example, as the force from a pneumatically driven piston.

The relative particle acceleration imparted throughout the plastic mass is in the nature of a compressional wave traveling through the mass, and appears to be reflected at the pressure surface, since this surface with a superincumbent weight would have considerable inertia and would absorb relatively little of the transmitted vibration. Such relative internal motion of particles in the mass causes them to become oriented and fall, as it were, into a closely knit together and interfitting structure occupying substantially a minimum of space. The resulting texture of the mass, as a rule, starts forming under the influence of the applied vibrations at some interior point, and spreads throughout the mass until finally a substantially uniform density is attained.

In order that the vibrations engendered shall have a proper amplitude, as indicated above, a sufficient time interval should transpire between the application of successive impacts. This, of course, involves the frequency of the vibrations. A frequency of less than 500 reciprocations per minute, as a rule, is too low since at such frequency relative particle acceleration is not attained in a freely moving body such as the mass being compacted when under the influence of gravity which is desired, as distinguished from uniform mass acceleration of the whole body, which is not desired.

Frequencies, for example, as high as 2000 reciprocations per minute, may be employed. The range of frequencies preferably employed in the practice of this step of the invention, however, lies between these limits.

The time for which the high frequency vibration is to be applied is also to be considered as the ultimate density attainable for the conditions prevailing is reached in a definite time. Under the influence of high frequency vibrations, within the preferable range of frequencies, the compacting of a mass of the proper consistency into a space of substantially from ¾ to ½ its original volume can be thus accomplished in a relatively short time, for example, in from 5 to 12 seconds.

The mixer, shown at 10, is illustrative of means specifically adapted to carry out the mixing of this invention; it has an upper hopper at 11 adapted to receive, in measured quantities, the components to be agglomerated. In the mixing chamber proper of this mixer, there is disposed a rotatable shaft 12 on which are secured mixing blades 13. These blades are preferably so shaped that the projection of their edges on the axis of the shaft make acute angles with it. Such an arrangement of the mixing blades insures that the components being mixed receives not only an axial urge but also an upward lift, thereby producing the desired agitation of the components within the mixing chamber, in substantially a physically suspended condition.

The mixing chamber is also provided with a movable bottom 14 arranged to be operated by suitable means, for example, by the hand lever shown at 15 to discharge the mixture, which drops into the lower hopper 16.

The mixer, as shown, has a heating element at 17, which comprises a suitable grid of pipe to which is admitted a heating medium, for example, steam. In the fabrication of fuel masses, the grid of pipe would be disposed over the mixing blades and provided with a series of orifices bored in "crisscross" fashion through their lower walls so that steam may be injected directly into the mixture while being agitated.

The working surface, shown at 20, is illustrative of means specifically adapted to carry out the working of this invention, and comprises a reciprocating table which is moved back and forth horizontally by means of the pitman 21 connected to the crank 22, which in turn is actuated by the rotating shaft 23; the whole is suitably mounted on the foundation 24.

In order that the working may be accomplished with the sudden application of force, the table is shown as provided with a stepped formation over which the mass is worked in a subdivided state. A movable closure or box 25, which has neither top nor bottom, is provided on the top step of the table. The top step of this table has an extension 26 on which the closure moves from a position directly under the hopper 16, where it receives a charge, into the position shown in full lines in Fig. 1. This closure is provided at 27 with a rearwardly projecting plate extending flush with its top edge to act as a valve for closing the bottom of the hopper 16 when the closure is moved out from under the hopper. The movement of the closure is effected at will by suitable means, for example, a fluid actuated piston shown at 28.

It will be seen that, when the closure 25 has received a charge from the hopper 16 and is moved to the full line position shown in Fig. 1, with each reciprocation of the table, a portion of the charge is permitted to exude from the bottom of closure upon the uppermost step of the table. This portion, as a cycle of the reciprocation is completed, is consequently sheared off.

The rate of reciprocation for the table at 20 is such that the portions thus cut off are jerked under their own inertia from step to step upon each reciprocation. The number of steps, which the working surface should be designed to have, will depend upon the number of sudden applications of force, or impacts, which are preferably applied in order to attain the particular fluid consistency desired. The capacity of the closure 25 and the extent of the working surface will of course depend upon the size and condition of the mass to be produced.

The vibrating machine, shown at 30, is illustrative of means specifically adapted to effect compacting by the yielding application of high frequency vibrations in accordance with this invention. This machine is provided with a mold box adapted to support the mass to be compacted, and has sides 31 which are fixed with respect to the foundation 24. The mold box has also a movable bottom or pallet 32 which has freedom of motion in a vertical direction. A rotating cam 33 is shown as resiliently mounted on a spring 34, and thereby arranged to impart yieldingly the vibratory impacts to the pallet. The mass while being compacted rests on this pallet and is subjected to compression by means of the pressure plate 35 which is adapted to be yieldingly pressed downward upon the mass by means of weight 36 and the interposed spring 37. This arrangement insures that the mass while being compacted is under substantially constant compression during the compacting period.

The rotating cam 33 is preferably maintained constantly rotating in order to avoid the necessity for overcoming its inertia when starting the same after it has once been stopped. Suitable means would, of course, be provided for moving the pallet and cam out of engagement when it is desired that the pallet shall not receive vibrations, for example, when filling or emptying the mold box.

When filling the mold box the pressure plate 35 is, of course, removed. The subdivided portions of the worked mass are dropped into the mold box from the lower end of the surface of the reciprocating table at 20; these fall layer upon layer, until the mold box is properly filled. During this filling operation however the cam 33 is preferably made to apply vibrations to the pallet 32, since such preliminary vibration, although it does not accomplish the ultimate compacting desired, still has a beneficial preparatory action. By this action any air bubbles, and the like, which still remain are quite thoroughly worked out of the mass. When the filling operation is completed, the pressure plate 35 is brought to bear on the top surface of the mass, and high frequency vibrations yieldingly applied on the opposite surface, thereby effecting the thorough compacting of the mass.

As the weight 36 follows down upon the mass and its compacting progresses, the possible amplitude of vibration for the particles within the mass becomes smaller and smaller. As a consequence less and less of the vibration is absorbed by the mass. The resilient support provided at 34 for the rotating cam, will be seen also to function so as to enable the reaction of the vibration to be absorbed during the latter part of the compacting stage.

To practice the process of this invention with the above described apparatus, when fabricating agglomerated masses, and in particular when fabricating fuel masses having the composition set forth in copending application Serial No. 684,682 filed January 5, 1924, one would proceed as follows:

Components comprising small coal and pitch would be taken in the ratio of substantially 10 or 11 parts by weight of coal to one of binder, and dumped into the hopper at 11, from their conveyance or conveyances, while the mixing blades 13 were being revolved. An appropriate amount of extraneous material, for example, 2 or 3% of clay and a small amount of napthaline, may be added if desired.

The total amount of material going into one batch in the mixer 10 may be added all at one time or in fractions. During this mixing operation, steam at a temperature well above the melting point of pitch, for example, at a temperature from substantially 250° to 350° F., is injected into the mixture from the grid of pipe at 17, which brings about a peculiar but desired condition, possibly colloidal, of the pitch as it is quite fluid.

When sufficiently mixed, the bottom 14 is moved, the batch thus mixed being permitted to drop into the lower hopper 16, where it is permitted to remain protected from drafts and other unfavorable influences, until withdrawn to be worked.

A portion may be withdrawn from the hopper 16, to be worked, by actuating the fluid piston at 28 to move the closure 25 beneath the hopper 16, where a charge will drop therein. By causing the closure 25 to move again to the full line position shown in Fig. 1, the charge is separated from the mass in the hopper 16 while the mouth of the hopper is at the same time closed; the charge itself being thus brought to the starting point of the working surface. With the charge in the closure at the starting point, the successive reciprocations of the table at 20, shear off portions of the charge which are flipped in quick succession from step to step on the table, and thereby receive a series of impacts which develop the consistency desired. Worked in this manner the plastic mass does not become materially cooled, though being divided into small portions does permit the escape of any excess of steam contained in the mass.

Preparatory to the compacting operation, the pressure plate 35 is removed from the mold box, so that the portions which successively traverse the whole of the working surface, fall in regular succession from the end of the table 20 into the mold box. A series of superposed layers having been thus built up in the mold box into a plastic block of desired size, the pressure plate is again applied to the top, and compacting effected by impacts imparted at high frequency from cam 33 to the pallet or bottom of the mold box. A preferred frequency for the cam 33 when fabricating fuel masses makes 1800 reciprocations of the pallet per minute. The weight at 36 would preferably be such as to apply from 4 to 15 pounds pressure per square inch of top surface to the mass in the mold box.

A fuel mass having the composition indicated above, and measuring approximately 50 by 13 inches in plan by 13 inches in height may be compacted, under the influence of vibrations applied in accordance with this invention, until it occupies a space of but 7 or 8 inches in height, possibly even less. A texture which is quite tough, resistant to attrition, and of substantially uniform density throughout is developed. The resulting density in this case would be in the neighborhood of 1.8.

Upon examination it will be found that the granules on the surface of such fabricated fuel are not broken as the result of the application of too much force. Dividing the mass at any point reveals that the innermost portions are equally as compact and closely knit together as the outer portions. The presence of a binder is scarcely discernible to the naked eye. It will also be observed that the granules have been worked into such close and interfitting formation that their opposing faces are in substantially parallel alignment approximating actual contact, and that no particles have been forced end on into close relationship.

A fuel or like mass, when thus compacted, is removed from the mold box, and the cycle of operations repeated until the whole of the mixed material within the hopper 16 is withdrawn. Mixed material, however, may be supplied to this hopper at will, so that this process may be practiced without interruption in substantially a continuous manner. This process is therefore readily distinguishable from what may be called "batch" processes, in which the batch mixed must each time be followed through to its ultimate state before the cycle of operations may be repeated.

In the apparatus shown in Figs. 2 to 6, the proper sequence of steps is insured by employing a single power device from which the several means for performing the various operations are actuated in the proper synchronism. This device has a single power driven pulley to which the actuating shafting for the several means is geared. Such an apparatus is well adapted to serve as a unit in a battery for a plant designed for the continuous practice of this process on a large scale. This apparatus will now be described in detail.

Figure 2:
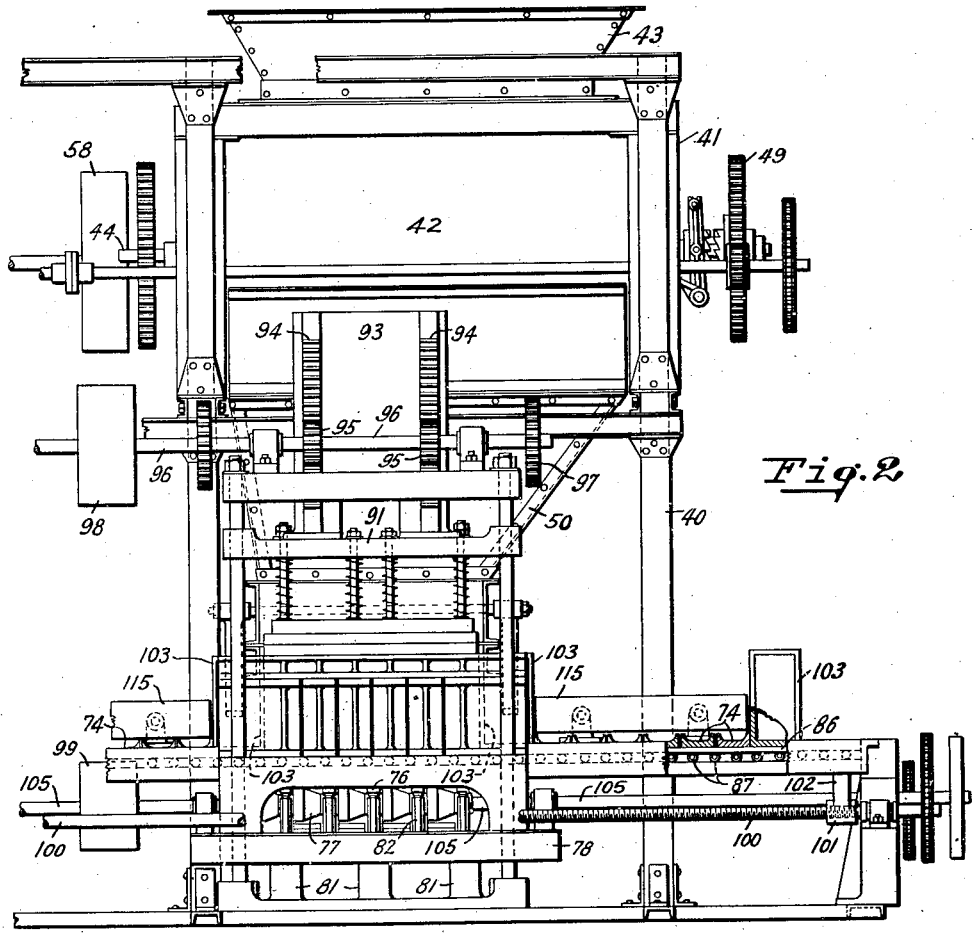
Fig. 2 is an end view showing an embodiment of apparatus actually adapted to carry out the process of this invention.
Figure 8:
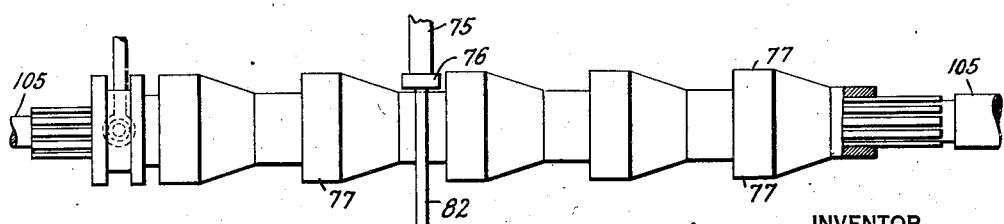
Fig. 8 is a fragmentary elevational view showing details of the cam employed in this apparatus.
Figure 3:
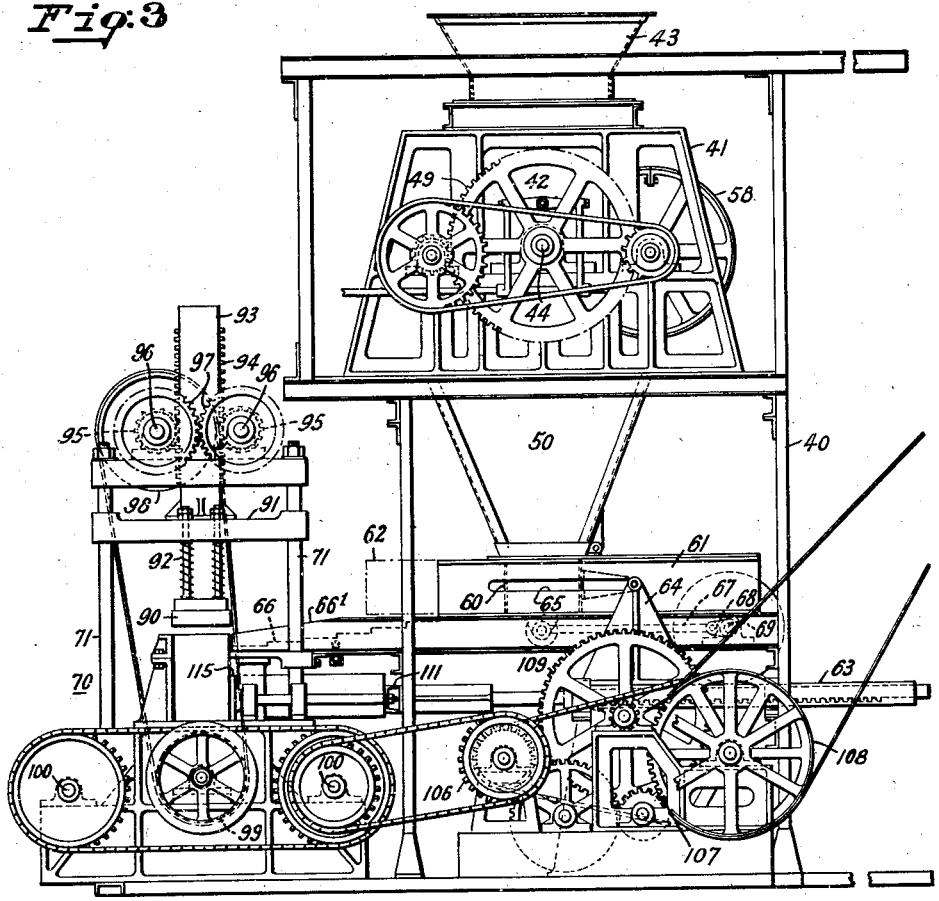
Fig. 3 is a side elevation of the apparatus shown in Fig. 2.
Figure 7:
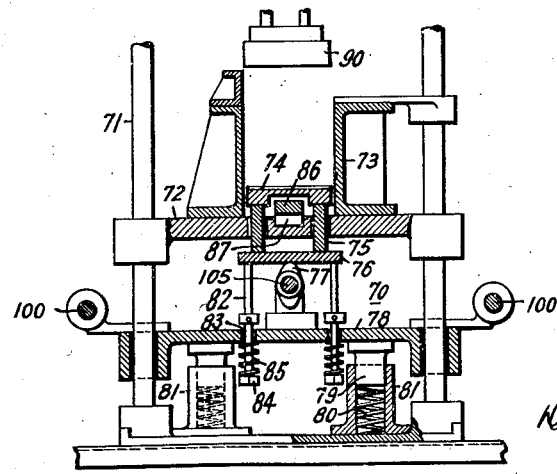
Fig. 7 is a fragmentary sectional view, showing details of a section of the apparatus shown in Fig. 3.

Referring particularly to Figs. 2 and 3, a framework 40 is shown as supporting, in elevated position, a mixing apparatus indicated generally at 41. This apparatus comprises a mixing chamber 42 having a receiving hopper 43, into which the components to be mixed are dumped. This mixing chamber, as shown in Fig. 5, has a power driven shaft 44 on which the mixing blades 45 are mounted. Arranged to pivot about the shaft 44 is a swinging bottom 46 having the rigidly secured sleeve 47, which serves as a bearing for shaft 44, and is actuated through a sliding collar 48 the latter being keyed to the sleeve 47 as indicated. The collar is adapted to be moved at will into engagement with the constantly rotating gear 49, which normally rotates on the sleeve 47 as an idler, but when the collar 48 is slid into engagement therewith, transmits power to the sleeve 47 to move the bottom 46 into an upper inverted position to discharge the mixed batch into the lower hopper 50. A stop means is provided for the bottom 46 to insure that it is stopped in the proper position when being brought to the lower position. This stop mechanism comprises a plunger 51, resiliently pressed into a groove 52 in the upper part of an end wall of the bottom 46. This plunger is connected at 53 with the lever 54, which is pivoted at 55 and arranged also to actuate the sliding collar 48. Thus when it is desired to apply power to move the bottom 46 the plunger 51 is automatically removed from engagement with the groove 52 thereby releasing the bottom to be moved by the gear 49. When the bottom is being brought back to the lower position and it appears to be approaching the desired point of rest, the collar 48 is disengaged from the gear 49. The momentum of the bottom will carry it on through to the position where the plunger 51 will snap into engagement with the groove 52 and thereby hold it fixed in the lower position. The mixing chamber is also provided with a grid of pipe shown at 56 in Fig. 5, which has openings through its lower walls 57 from which steam is injected directly into the mass being mixed.

This mixing apparatus is shown as actuated with power which is received by a single pulley 58. This pulley in turn distributes its power through suitable gearing, both to the gear 49 for moving the bottom 46 at will, and to the shaft 44, which is constantly rotated.

Beneath the hopper 50 is disposed the closure or box 60, which is adapted to slide on suitable ways, shown at 61, from a position directly beneath the hopper to an extended position shown in broken lines at 62. The movement of this closure is effected at will by a power actuated reciprocating shaft 63, which has a triangular cross-head 64, which is connected to move the closure 60 through the slot 65, shown in the ways 61.

Disposed beneath the ways 61 is the working surface, comprising the stepped table indicated by the broken lines at 66. The table 66 has a pitman 67 connected to the crank 68 on the constantly rotating shaft 69. It is thus seen that when the closure 60 is in the extended position shown at 62, that the successive reciprocations of the table 66 shear off portions of the charge withdrawn by the closure 60. This table has side guides shown at 66'.

The vibrating machine in this apparatus is shown generally at 70, and comprises the upright supports 71 which have rigidly secured thereto a plane bed plate 72 which supports the side 73 of the mold box in which the compacting takes place. This mold box has a movable bottom or pallet 74, which is adapted to be reciprocated by the vertical moving plungers 75, rigidly secured to a tappet plate 76 disposed beneath the bed plate 72. This tappet plate receives vibratory impacts from the rotating cam 77 which is mounted on a secondary movable bed plate 78. This movable bed plate has a plurality of plungers 79 projecting from its lower surface which bear upon heavy springs 80, disposed in suitable sockets 81 that are formed in the base of the machine.

The tappet plate 76 is held in place by means of the rods 82 which extend downwardly and project through suitable openings 83 in the movable bed plate 78. Between heads 84 formed on the ends of these rods and the under surface of the bed plate 78 there are disposed springs 85 which draw the tappet plate 76 normally downward. The impacts from the cam 77 upon the tappet plate 76 work against these springs.

The movable pallet 74 is preferably made in a plurality of sections, disposed straddle-like over a bar 86, which is adapted to be moved longitudinally between the sides of the mold box to convey away the pallet sections, when supporting compacted masses. The bar 86 rides on anti-friction rollers 87 disposed in the bed-plate 72. Arranged to bear down upon the mass being compacted in the mold box is the pressure plate 90. This plate is attached by rods to the weight 91 which slides downwardly on the supports 71, and has the springs 92 disposed about the rods, by which the force of the weight 91 is resiliently applied to plate 90. The weight 91 is also provided with an upwardly extending plunger 93 having a rack 94, the teeth of which are engaged by the gears 95 mounted on shafts 96 that are disposed on the top of the machine and have end gears at 97 which engage with each other. One of these shafts is driven by a pulley 98 by power applied at will from the pulley 99, so as to raise the weight 91 and the pressure plate when desired.

The shafts shown at 100 are screw-threaded and are arranged to be driven intermittently. The nuts 101 engage with these threads and are moved horizontally by the shafts 100 when they rotate, the nuts being connected by the extensions 102 with the bar 86, astride of which the pallet sections are disposed. This bar also carries a plurality of mold ends shown at 103. It is thus seen that by means of the shafts 100 that the bar 86 is moved to withdraw one set of pallet sections from the mold box and at the same time bringing another set into place. This bar preferably is provided with three sets of sections.

The shaft 105 on which the cam 77 is mounted is preferably kept constantly rotating, the cam as shown in Fig. 3 being preferably composed of sections somewhat conical in formation, the whole being slidable longitudinally on the shaft 105 from a position in which the eccentric edges of the cam engage with the tappet plate 76, which is also formed in sections, to another position where the eccentric edges of the cam do not engage with the tappet plate. (For the purpose of this arrangement the sections of the cam, the tappet plate and the pallet are made to correspond.) Thus by a longitudinal movement of the cam on the shaft 105 it is moved into and out of positions where it will, or will not impart vibratory impacts to the tappet plate 76, as the case may be.

The motion of the shafts 100 is controlled at will through the gearing 106 of the power element 107, which receives its power through a single pulley 108 and drives at will the gear 109 through the reversing clutch shown at 110 (see Fig. 4). The gear 109 may thus be rotated in either direction to transmit motion to the reciprocating shaft 63.

The shaft 63 not only moves the triangular cross-head 64, but is extended forwardly so as to move the transverse cross-head 111. The crosshead 111 as shown in Fig. 4 has a portion 112 to which are secured a plurality of blades 113, which are adapted to be pushed through slots in the adjacent wall 73 of the mold box when the closure 60 is moved to the extended position shown at 62. These blades fit between the sections of the pallet 74 and are thus adapted to sectionalize the mass being compacted in the mold box.

The cross-head 111 is also conveniently provided with plungers at 114 which have secured on their end the upstanding plate 115, which is adapted to be pushed across the pallet sections 74 as they are drawn out from the mold box to one side, for example to the right-hand side as shown in Figs. 2 and 4. This movement of the upstanding plate 115 across the pallet sections 74 is thus synchronized with the beginning of each new charge being worked on table 66, and with the placing of blades 113 in the mold box, such movement pushing off any fabricated masses and from thence conveniently removed to a place of use, or storage as the case may be.

To practice the process of this invention with the last described apparatus, it would be set into operation as will be readily understood in substantially the same manner as that described above for the apparatus shown in Fig. 1. In the last form of apparatus, however, provision is made which mechanically insures the proper sequence of certain of the steps, particularly the working, compacting and removing operations so as to be independent of the attention of an operator.

It will be observed that by this arrangement the blades 113 are inserted in the mass to be vibrated at substantially the beginning of the filling of the mold box and are not withdrawn until the compacting operation is completed and a new charge is to be drawn from the hopper 50. The blades 113 thus serve as partitions in the mold box to sectionalize the mass being fabricated into sizes convenient for use.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process of fabricating agglomerated masses which comprises conditioning a mixture containing insoluble granular material and amorphus binder which is non-crystal forming and relatively viscous so as to attain a desired state of fluidity, and compacting the same by the yielding application of high frequency vibrations.

2. A process of fabricating agglomerated masses which comprises conditioning a mixture containing insoluble granular material and amorphous binder which is non-crystal forming and relatively viscous so as to attain a desired state of fluidity, and compacting the same by the yielding application of high frequency vibrations while subject to substantially constant compression.

3. A process of fabricating agglomerated masses which comprises conditioning a mixture containing insoluble granular material and amorphous binder which is non-crystal forming and relatively viscous so as to attain a desired state of fluidity, and compacting the same by the simultaneous yielding application of direct and reflected high frequency vibrations.

4. A process of fabricating agglomerated masses which comprises conditioning a mixture containing insoluble granular material and amorphous binder which is non-crystal forming and relatively viscous so as to attain a desired state of fluidity, and compacting the mixture by the simultaneous yielding application of high frequency vibrations and pressure on respectively opposite surfaces.

5. A process of fabricating agglomerated masses which comprises mixing heterogeneous components including insoluble granular material and amorphous binder which is non-crystal forming and relatively viscous while subject to heat, subsequently working the mixture without substantial loss of heat until a desired consistency is attained, and then compacting the mixture by the yielding application of high frequency vibrations.

6. A process of fabricating agglomerated masses which comprises mixing heterogeneous components including insoluble granular material and amorphous binder which is non-crystal forming and relatively viscous while subject to heat, subsequently working the mixture without substantial loss of heat until a desired consistency is attained, and then compacting the mixture by the yielding application of high frequency vibrations while subject to substantially constant compression.

7. A process of fabricating agglomerated masses which comprises mixing heterogeneous components including granular material and binder while subject to the action of live steam, subsequently working the mixture so as to permit the escape of excess steam but without substantial loss of heat, and then compacting the mixture by the yielding application of high frequency vibrations while subject to substantially constant compression.

8. A process of fabricating agglomerated masses which comprises mixing heterogeneous components including granular material and binder while subject to the action of live steam, subsequently working the mixture so as to permit the escape of excess steam without substantial loss of heat, and then compacting the mixture by the simultaneous yielding application of direct and reflected high frequency vibrations.

9. A process of fabricating agglomerated masses which comprises mixing heterogeneous components including granular material and binder while subject to the action of live steam, subsequently working the mixture so as to permit the escape of excess steam but without substantial loss of heat, and then compacting the mixture by the simultaneous yielding application of high frequency vibrations and pressure on respectively opposite surfaces.

10. A process of fabricating agglomerated masses which comprises mixing together in a substantially physically suspended condition heterogeneous components including granular material and binder while subject to the action of live steam, subsequently working the mixture so as to permit the excess of steam to escape but without substantial loss of heat until a desired consistency is attained, and then compacting the mixture by the yielding application of high frequency vibrations while subject to substantially constant compression.

11. A process of fabricating agglomerated masses which comprises mixing together in substantially physically suspended condition heterogeneous components including granular material and binder while subject to the action of live steam, subsequently working the mixture so as to permit the escape of excess steam but without substantial loss of heat, and then compacting the mixture by the simultaneous yielding application of high frequency vibrations and pressure on respectively opposite surfaces.

12. A process of fabricating agglomerated masses which comprises mixing together in a substantially physically suspended condition heterogeneous components including granular material and binder while subject to the action of live steam, subsequently working the mixture with the sudden application of force but without substantial loss of heat until a desired consistency is attained, and then compacting the mixture by yieldingly applying high frequency vibrations to one surface with the simultaneous application of a resilient pressure element to an opposite surface.

13. A process of fabricating agglomerated masses which comprises mixing heterogeneous components including insoluble granular material and amorphous binder which is non-crystal forming and relatively viscous, subsequently working the mixture with a sudden application of force until a desired consistency is attained, and then compacting the mixture by the application of high frequency vibrations.

14. A process of fabricating agglomerated masses which comprises mixing heterogeneous components including insoluble granular material and amorphous binder which is non-crystal forming and relatively viscous, subsequently working the mixture with the sudden application of force until a desired consistency is attained, and then compacting the mixture by the application of high frequency vibrations while subject to substantially constant compression.

15. A process of fabricating agglomerated masses which comprises mixing together in substantially physically suspended condition heterogeneous components including insoluble granular material and amorphous binder which is non-crystal forming and relatively viscous, subsequently working the mixture with a sequence of regularly applied impacts, and then compacting the mixture by the application of high frequency vibrations.

16. A process of fabricating agglomerated masses which comprises mixing together in a substantially physically suspended condition heterogeneous components including insoluble granular material and amorphous binder which is non-crystal forming and relatively viscous, subsequently working the mixture with a sequence of regularly applied impacts, and then compacting the mixture by the application of high frequency vibrations while subject to substantially constant compression.

17. A process of fabricating agglomerated masses which comprises mixing together in a substantially physically suspended condition heterogeneous components including carboniferous material and amorphous binder which is non-crystal forming and relatively viscous while subject to the action of heat at a temperature substantially in excess of the melting point of the binder, subsequently working the mixture with the application of force, and then compacting the mixture by the simultaneous applications of high frequency vibrations and pressure on respectively opposite surfaces.

18. A process of fabricating agglomerated masses which comprises mixing together in a substantially physically suspended condition heterogeneous components including insoluble granular material and amorphous binder which is non-crystal forming and relatively viscous, subsequently working the mixture with a sequence of regularly applied impacts, and then compacting the mixture by yieldingly applying high frequency vibrations to one surface with the simultaneous application of a resilient pressure element to an opposite surface.

19. A process of fabricating agglomerated masses which comprises mixing heterogeneous components including insoluble granular material and amorphous binder which is non-crystal forming and relatively viscous while subject to heat, subsequently working the mixture with the sudden application of force but without substantial loss of heat until a desired consistency is attained, and then compacting the mixture by the application of high frequency vibrations while subject to substantially constant compression.

20. A process of fabricating agglomerated masses which comprises mixing heterogeneous components including insoluble granular material and amorphous binder which is non-crystal forming and relatively viscous while subject to heat, subsequently working the mixture with the sudden application of force but without substantial loss of heat until a desired consistency is attained, and then compacting the mixture by the simultaneous application of high frequency vibrations and pressure on respectively opposite surfaces.

21. A process of fabricating agglomerated masses which comprises mixing heterogeneous components including granular material and binder while subject to the action of live steam, subsequently working the mixture with a sequence of regularly applied impacts, and then compacting the mixture by the application of high frequency vibrations.

22. In a process of fabricating agglomerated masses which comprises mixing heterogeneous components including granular material and binder while subject to the action of live steam, subsequently working the mixture with a sequence of regularly applied impacts, and then compacting the mixture by the application of high frequency vibrations while subject to substantially constant compression.

23. A process of fabricating agglomerated masses which comprises mixing heterogeneous components including granular material and binder while subject to the action of live steam, subsequently working the mixture with a sequence of regularly applied impacts, and then compacting the mixture by the simultaneous application of direct and reflected high frequency vibrations.

24. A process of fabricating agglomerated masses which comprises mixing heterogeneous components including granular material and binder while subject to the action of live steam, subsequently working the mixture with a sequence of regularly applied impacts, and then compacting the mixture by the simultaneous application of high frequency vibrations and pressure on respectively opposite surfaces.

25. A process of fabricating agglomerated masses which comprises mixing together in substantially physically suspended condition heterogeneous components including insoluble granular material and amorphous binder which is non-crystal forming and relatively viscous while subject to heat, subsequently working the mixture with the sudden application of force but without substantial loss of heat until a desired consistency is attained, and then compacting the mixture by the application of high frequency vibrations.

26. The process of fabricating agglomerated masses which comprises mixing together in substantially physically suspended condition heterogeneous components including insoluble granular material and amorphous binder which is non-crystal forming and relatively viscous while subject to heat, subsequently working the mixture with the sudden application of force but without substantial loss of heat until a desired consistency is attained, and then compacting the mixture by the simultaneous application of high frequency vibrations and pressure on respectively opposite surfaces.

27. The process of fabricating agglomerated fuel masses which comprises mixing together in substantially physically suspended condition heterogeneous components including carboniferous material and binder while subject to the action of live steam, subsequently working the mixture with a sequence of regular impacts applied so as to permit the escape of excess steam, and then compacting the mixture by the simultaneous application of direct and reflected high frequency vibrations.

28. The process of fabricating agglomerated fuel masses which comprises mixing together in substantially physically suspended condition heterogeneous components including carboniferous material and binder while subject to the action of live steam, subsequently working the mixture with a sequence of regular impacts applied so as to permit the escape of excess steam, and then compacting the mixture by the simultaneous application of high frequency vibrations and pressure on respectively opposite surfaces.

29. A process of fabricating agglomerated fuel masses which comprises mixing together in substantially physically suspended condition heterogeneous components including carboniferous material and binder while subject to the action of live steam, subsequently working the mixture with a sequence of regular impacts applied so as to permit the escape of excess steam, and then compacting the mixture by the yielding application of high frequency vibrations to one surface with the simultaneous application of a resilient pressure element to an opposite surface.

30. A process of fabricating agglomerated masses which comprises mixing heterogeneous components including insoluble granular material and amorphous binder, which is non-crystal forming and relatively viscous, subsequently working the mixture in a subdivided state with the sudden application of force, preliminarily vibrating the divided portions, and then compacting the same by the simultaneous yielding application of direct and reflected high frequency vibrations.

31. A process of fabricating agglomerated masses which comprises mixing heterogeneous components including insoluble granular material and amorphous binder which is non-crystal forming and relatively viscous, subsequently working the mixture in a subdivided state with the sudden application of force, preliminarily vibrating the divided portions, and then compacting the same by the simultaneous yielding application of high frequency vibrations and pressure on respectively opposite surfaces.

32. A process of fabricating agglomerated fuel masses which comprises mixing heterogeneous components including carboniferous material and amorphous binder while subject to the action of live steam, subsequently working the mixture in a subdivided state over a stepped surface with a sequence of regularly applied impacts, preliminarily vibrating the divided portions, and then compacting the same by the simultaneous yielding application of high frequency vibrations and pressure on respectively opposite surfaces.

33. In a process of fabricating agglomerated fuel masses, the step which comprises working a heated mixture of heterogeneous components including carboniferous material and binder over a stepped surface by means of a series of reciprocations imparted to the surface so as to cause the mixture to be flipped from step to step.

34. In a process of fabricating agglomerated masses, the step which comprises compacting a relatively fluid mixture including insoluble granular material and amorphous binder which is non-crystal forming and relatively viscous by the yielding application of high frequency vibrations.

35. In a process of fabricating agglomerated masses, the step which comprises compacting a relatively fluid mixture of heterogeneous components including insoluble granular material and amorphous binder which is non-crystal forming and relatively viscous by the simultaneous yielding application of high frequency vibrations and pressure on respectively opposite surfaces.

36. In a process of fabricating agglomerated fuel masses, the step which comprises compacting a relatively fluid mixture of heterogeneous components including insoluble granular material and amorphous binder which is non-crystal forming and relatively viscous by subjecting the same to a preliminary vibration and then to an intense vibration by the simultaneous yielding application of high frequency vibrations and pressure on respectively opposite surfaces.

37. A fabricated agglomerated mass comprising granular material and a binder having a relatively high degree of viscosity and of a character such that it may be worked before curing and becomes rigid when cured and taken at or below the limit of one part by weight to ten of granular material, said components being mixed together and compacted so as to yield a relatively rigid mass when subject to bending and tensile stresses, having an interfitting closely knit amorphous structure of substantially uniform density and texture, as produced by the process of claim 1.

38. A fabricated agglomerated mass comprising granular material and binder having a relatively high degree of viscosity and of a character which is substantially rigid when cold and viscous when hot, and taken at or below the limit of one part by weight to ten of granular material, said components being mixed together and compacted so as to yield a relatively rigid mass when subject to bending and tensile stresses which is not friable and has an interfitting and closely knit amorphous structure of substantially uniform density and texture as produced by the process of claim 1.

39. A fabricated agglomerated mass comprising granular material and binder having a relatively high degree of viscosity and of a character which is substantially rigid when cold and viscous when hot, and taken at or below the limit of one part by weight to ten of granular material, said components being mixed together and compacted so that the granules have their adjacent surfaces oriented into close juxtaposition, forming a mass, which is relatively rigid when subject to bending and tensile stresses and is not friable, having a composite amorphous structure closely knit together of substantially uniform density and texture as produced by the process of claim 1.

40. A fabricated agglomerated mass comprising granular material and binder having a relatively high degree of viscosity and dispersed substantially uniformly throughout the mass, the binder being taken at or below the limit of one part by weight to ten of granular material, the bodies of the latter being oriented into interfitting relation with their opposing surfaces brought into substantially parallel arrangement and united by compressional stresses producing uniform density and texture throughout the mass, the compressional stresses being the result of high frequency vibration, applied as specified in claim 6.

41. A frabricated agglomerated mass comprising irregular bodies and binder having a relatively high degree of viscosity and of a character which is substantially rigid when cold and viscous when hot, the binder being taken at or below the limit of one part by weight to ten of granular bodies and dispersed substantially uniformly throughout the mass, said granular bodies being oriented into a compact and amorphous structure having a substantially uniform texture of relatively high density as produced by the process of claim 6.

42. A fabricated fuel mass comprising irregular granular carboniferous material and binder having a relatively high degree of viscosity and mixed into and dispersed substantially uniformly throughout the mass, the binder being taken at or below the limit of one part by weight to ten of carboniferous material so as to yield an interfitting and closely knit amorphous structure having a substantially uniformly dense and non-friable texture, as produced by the process of claim 6.

43. A fabricated fuel mass comprising granular particles of coal and pitch dispersed substantially uniformly throughout the mass so as to hold the coal particles in an interfitting and closely knit amorphous structure, the pitch being taken at or below the limit of one part by weight to ten of coal particles whereby a mass results which is relatively rigid when subject to bending and tensile stresses, having a substantially uniformly dense and nonfriable texture as produced by the process of claim 6.

44. A fabricated fuel mass comprising granular particles of coal and amorphous, non-crystal forming binder of a character which is substantially rigid when cold and viscous when hot, and dispersed substantially uniformly throughout the mass so as to hold the granular faces in interfitting relation with uniform compressional stresses, the binder being taken at or below the limit of one part by weight to ten of coal, the resulting mass being relatively rigid when subject to bending and tensile stresses, substantially non-friable, having relatively great resistance to attrition, and of substantially uniform density and texture as produced by the process of claim 6.

45. A fabricated fuel block comprising coal particles agglomerated with binder having a relatively high degree of viscosity and of a character which is substantially rigid when cold and viscous when hot, said binder being dispersed substantially uniformly throughout the mass, and taken at or below the limit of one part by weight to ten of coal, the particles interfitting in substantially uncrushed formation and united and knit together, the mass resulting having substantially uniform density as produced by the process of claim 1.

46. A fabricated fuel block comprising granular coal particles agglomerated with a pitch binder dispersed substantially uniformly throughout the mass of a character which is rigid when cold, and viscous when hot and taken in amounts not substantially in excess of 10% by weight of the total mass, the granules interfitting exteriorly in uncrushed formation and united and knit together by substantially uniform compressional stresses throughout the resulting mass, and having substantially uniform density as produced by the process of claim 6.

47. A fabricated fuel mass of irregular shape comprising irregular granular carboniferous material admixed with a pitch binder of a character which is substantially rigid when cold and viscous when hot, the binder being dispersed substantially uniformly throughout the mass, and taken at or below the limit of one part by weight to ten of carboniferous material, the granules thereof being oriented into interfitting relation with their opposing faces substantially parallel and united by substantially uniform compressional stresses throughout the mass, the compressional stresses being the result of the application of high frequency vibration according to the process of claim 17.

In testimony whereof I affix my signature.

RICHARD BOWEN.